United States Patent Office.

PAUL FRIEDRICH PALLAS, OF DRESDEN, SAXONY, GERMANY.

CATTLE-FOOD.

SPECIFICATION forming part of Letters Patent No. 413,729, dated October 29, 1889.

Application filed May 28, 1889. Serial No. 312,468. (No specimens.) Patented in Belgium March 6, 1887, No. 80,894; in Germany May 8, 1887, No. 41,970, and December 2, 1887, No. 43,672; in France June 8, 1887, No. 184,095; in England December 21, 1887, No. 17,570; in Norway January 7, 1888, No. 739; in Sweden January 9, 1888, No. 1,314; in Austria-Hungary June 13, 1888, No. 25,952 and No. 49,664, and in Spain February 5, 1889, No. 9,051.

*To all whom it may concern:*

Be it known that I, PAUL FRIEDRICH PALLAS, a subject of the King of Saxony, residing at Dresden, in Saxony, Germany, have invented a certain new and useful Improvement in Cattle and Poultry Food, (for which I have obtained Letters Patent in Germany, No. 41,970, May 8, 1887, and No. 43,672, December 2, 1887; France, No. 184,095, June 8, 1887; Belgium, No. 80,894, March 6, 1887; Austria-Hungary, No. 25,952 and No. 49,664, June 13, 1888; Sweden, No. 1,314, January 9, 1888; Norway, No. 739, January 7, 1888; Great Britain, No. 17,570, December 21, 1887, and Spain, No. 9,051, February 5, 1889;) and I do hereby declare that the following is a full, clear, and exact description of the invention, which will enable others skilled in the art to which it appertains to make and use the same.

This invention consists in an improved food or cake for feeding cattle, poultry, &c.

The improved food is designed to contain flesh-forming and fat-forming ingredients and matters assistant to digestion. The method of manufacturing the same is as follows: Two decoctions are made. For the first, one kilogram of malt, ground or unground, or of malt-extract, or malt in any other form, is boiled in ten to eleven liters of water and the decoction allowed to cool. The second decoction is made by boiling one kilogram of carrageen-moss (*Fucus crispus*) in twenty to twenty-five liters of water, loss by evaporation being replaced by added water from time to time. Instead of carrageen-moss any other vegetable matter rich in proteine and fat may be taken—for instance, oil-seeds, residue from the manufacture of oil, or refuse from sugar-manufacture, and a decoction made therewith. The second decoction is also allowed to cool. These two decoctions can be made together, provided the materials above mentioned which are taken for the second do not need a longer boiling than the malt, such being, however, the case with carrageen-moss. When only one decoction is made, one kilogram of malt and one kilogram of the substance containing proteine and fatty matters are mixed and boiled together in thirty to thirty-six liters of water. To this decoction, or after mixing together the two decoctions, if made separately as aforesaid, sufficient grain or its product—such as oatmeal, cut-up pod-plants, or rape-seed, oil-seed, or product thereof—for instance, the refuse from oil or rice mills—and chaff—is added and kneaded therewith to make a thick dough. This dough is then spread into a suitable shape and dried either by heat or by mechanical or chemical means. For a poultry-food the chaff is omitted and its place taken by meat, dried meat, or bone-powder.

The proportions taken are preferably such that the food is composed as follows:

| | |
|---|---|
| Chaff (or its equivalent for poultry-food) | 30 parts |
| Oatmeal, pea-flour, or similar flour or other grain-meal, oil-seeds, or other vegetable produce, as aforesaid | 60 " |
| Malt | 8 " |
| Carrageen-moss, or matters containing proteine and fat, as aforesaid | 2 " |
| Total | 100 " |

I claim—

The combination of malt and carrageen-moss with alimentary vegetable matters, as specified, and chaff, substantially as and for the purpose set forth.

In witness whereof I have signed this specification in presence of two witnesses.

PAUL FRIEDRICH PALLAS.

Witnesses:
 OTTO WOLFF,
 PAUL DRUCKMÜLLER.